(12) United States Patent  (10) Patent No.: US 9,222,182 B2
Croke  (45) Date of Patent: Dec. 29, 2015

(54) ELECTROCHEMICAL ACTIVATION DEVICE

(71) Applicant: Simple Science Limited, Waterford (IE)

(72) Inventor: Eoin Croke, Co Kilkenny (IE)

(73) Assignee: Simple Science Limited, Waterford (IE)

( * ) Notice: Subject to any disclaimer, the term of this patent is extended or adjusted under 35 U.S.C. 154(b) by 127 days.

(21) Appl. No.: 13/918,411

(22) Filed: Jun. 14, 2013

(65) Prior Publication Data

US 2014/0367247 A1  Dec. 18, 2014

(51) Int. Cl.
| | |
|---|---|
| C02F 1/467 | (2006.01) |
| C25B 15/02 | (2006.01) |
| C25B 15/08 | (2006.01) |
| C25B 1/26 | (2006.01) |
| C25B 9/18 | (2006.01) |
| C25B 1/02 | (2006.01) |
| C02F 1/461 | (2006.01) |
| C25B 1/10 | (2006.01) |
| C25B 13/04 | (2006.01) |

(52) U.S. Cl.
CPC . *C25B 9/18* (2013.01); *C02F 1/467* (2013.01); *C02F 1/4618* (2013.01); *C02F 1/4674* (2013.01); *C25B 1/02* (2013.01); *C25B 1/10* (2013.01); *C25B 1/26* (2013.01); *C25B 13/04* (2013.01); *C25B 15/02* (2013.01); *C25B 15/08* (2013.01)

(58) Field of Classification Search
CPC ....... C02F 1/4618; C02F 1/4674; C25B 1/10; C25B 1/26; C25B 9/18; C25B 15/02; C25B 15/08
USPC .................... 204/229.8, 257, 275.1
See application file for complete search history.

(56) References Cited

U.S. PATENT DOCUMENTS

| | | | |
|---|---|---|---|
| 4,952,298 A | * | 8/1990 | Bouche-Pillon et al. .. 204/228.3 |
| 5,290,405 A | | 3/1994 | Joshi et al. |
| 5,427,667 A | | 6/1995 | Bakhir et al. |
| 5,445,722 A | | 8/1995 | Yamaguti et al. |
| 5,540,819 A | | 7/1996 | Bakhir et al. |
| 5,628,888 A | | 5/1997 | Bakhir et al. |
| 5,635,040 A | | 6/1997 | Bakhir et al. |
| 5,783,052 A | | 7/1998 | Bakhir et al. |

(Continued)

FOREIGN PATENT DOCUMENTS

| | | |
|---|---|---|
| EP | 0612694 A1 | 8/1994 |
| EP | 1314699 A1 | 5/2003 |

(Continued)

*Primary Examiner* — Nicholas A Smith
(74) *Attorney, Agent, or Firm* — Schwegman Lundberg & Woessner, P.A.

(57) ABSTRACT

A system comprises a plurality of electrochemical cells each comprising an anode chamber and a cathode chamber, each cell configured to electrolyze electrolyte to generate an anolyte and a catholyte, a plurality of sets of one or more flow control devices, each of the sets being configured to control a flow rate of the electrolyte into a corresponding cell, a plurality of current measuring devices, each configured to measure a current across a corresponding one of the plurality of cells, and a control system in data communication with the flow control devices and the current measuring devices. The control system is configured to compare the measured current across each of the cells to a current set point, and control the flow control devices to adjust the flow rate of the electrolyte in response to a difference between the measured current across a cell and the current set point.

14 Claims, 7 Drawing Sheets

(56) References Cited

U.S. PATENT DOCUMENTS

| | | | |
|---|---|---|---|
| 5,871,623 A | 2/1999 | Bakhir et al. | |
| 5,938,916 A | 8/1999 | Bryson et al. | |
| 5,985,110 A | 11/1999 | Bakhir et al. | |
| 5,989,396 A | 11/1999 | Prasnikar et al. | |
| 6,004,439 A | 12/1999 | Bakhir et al. | |
| 6,126,797 A | 10/2000 | Sato et al. | |
| 6,143,163 A | 11/2000 | Sawamoto et al. | |
| 6,200,434 B1 | 3/2001 | Shinjo et al. | |
| 6,228,251 B1 | 5/2001 | Okazaki | |
| 6,379,525 B1 | 4/2002 | Clements et al. | |
| 6,428,689 B1 | 8/2002 | Kameyama et al. | |
| 6,468,412 B2 | 10/2002 | Bryan et al. | |
| 6,527,940 B1 | 3/2003 | Shimamune et al. | |
| 6,843,895 B2 | 1/2005 | Bakir et al. | |
| 7,235,169 B2 | 6/2007 | Nakamura et al. | |
| 7,303,660 B2 | 12/2007 | Buckley et al. | |
| 7,658,834 B2 | 2/2010 | Salerno | |
| 7,897,023 B2 | 3/2011 | Bakhir et al. | |
| 2006/0076248 A1 | 4/2006 | Kindred | |
| 2007/0007145 A1* | 1/2007 | Simmons et al. | 205/357 |
| 2007/0138020 A1 | 6/2007 | Balagopal et al. | |
| 2007/0187262 A1* | 8/2007 | Field et al. | 205/742 |
| 2009/0071843 A1 | 3/2009 | Miyashita et al. | |
| 2010/0283169 A1 | 11/2010 | Emmons | |
| 2011/0030959 A1 | 2/2011 | Emmons | |
| 2011/0186462 A1 | 8/2011 | Storey et al. | |
| 2011/0189302 A1* | 8/2011 | Van Niekerk et al. | 424/600 |
| 2011/0210075 A1 | 9/2011 | Enos et al. | |
| 2011/0226615 A1 | 9/2011 | Bakhir et al. | |
| 2012/0168319 A1 | 7/2012 | Iltsenko et al. | |
| 2012/0175267 A1 | 7/2012 | Bhavaraju et al. | |
| 2013/0327353 A1* | 12/2013 | Field et al. | 134/1 |

FOREIGN PATENT DOCUMENTS

| | | |
|---|---|---|
| EP | 1551770 | 4/2004 |
| EP | 2439177 A1 | 4/2012 |
| GB | 2453050 A | 3/2009 |
| GB | 2479286 A | 6/2010 |
| WO | WO-2010064946 A1 | 6/2006 |
| WO | WO-2006127633 A2 | 11/2006 |
| WO | WO-2007065228 A1 | 6/2007 |
| WO | WO-2007075865 A2 | 7/2007 |
| WO | WO-2008026027 A1 | 3/2008 |
| WO | WO-2008030216 A1 | 3/2008 |
| WO | WO-2008097567 A1 | 8/2008 |
| WO | WO-2008105613 A1 | 9/2008 |
| WO | WO-2009100870 A2 | 8/2009 |
| WO | WO-2012019016 A2 | 2/2012 |
| WO | WO-2012079056 A1 | 6/2012 |

* cited by examiner

ELECTROCHEMICAL ACTIVATION DEVICE

BACKGROUND

An electrochemical cell can be configured to perform chemical electrolysis by passing electric current through a solution of solvated (e.g., aqueous) ionic substance or a molten ionic substance. Electrolysis of aqueous sodium chloride, also referred to as brine, in a diaphragm cell can form useful solutions, such as a biocidal solution that can be used as a cleaning or disinfecting agent.

SUMMARY

The present disclosure is directed to one or more examples of an electrochemical activation device comprising one or more electrochemical cells. The electrochemical activation device can provide for a more consistent output of solutions being generated by the electrochemical cell or cells, and can provide for increased efficiency over previous electrochemical activation devices.

The present disclosure describes a system comprising a plurality of electrochemical cells each comprising an anode chamber and a cathode chamber, each electrochemical cells being configured to electrolyze an electrolyte to generate an anolyte fluid and a catholyte fluid, a plurality of sets of one or more flow control devices, each of the plurality of sets of one or more flow control devices being configured to control a flow rate of the electrolyte into a corresponding one of the plurality of electrochemical cells, a plurality of current measuring devices, each of the plurality of current measuring devices being configured to measure a current across a corresponding one of the plurality of electrochemical cells, and a control system in data communication with the plurality of sets of one or more flow control devices and the plurality of current measuring devices. The control system is configured to compare the measured current across each of the plurality of electrochemical cells to a current set point and control the corresponding set of one or more flow control devices to adjust the flow rate of the electrolyte in response to a difference between the measured current across the electrochemical cell and the current set point.

The present disclosure also describes a system comprising at least one electrochemical cell comprising an anode chamber and a cathode chamber, the at least one electrochemical cell being configured to electrolyze an electrolyte to generate anolyte fluid and catholyte fluid, a first fluid delivery line in fluid communication with the anode chamber of the at least one electrochemical cell, a second fluid delivery line in fluid communication with the cathode chamber of the at least one electrochemical cell, a catholyte reservoir configured to receive the catholyte fluid from the at least one electrochemical cell, a temperature measuring device configured to measure a temperature of at least one of the fluid in the anode chamber, the fluid in the cathode chamber, the catholyte fluid output from the cathode chamber, and the catholyte fluid in the catholyte reservoir, at least one flow control device configured to control a flow rate of the catholyte fluid from the catholyte reservoir, an outlet of the at least one flow control device being in fluid communication with the second fluid delivery line, and a control system in data communication with the temperature measuring device and the at least one flow control device. The control system is configured to compare the measured temperature of the at least one of the fluid in the anode chamber, the fluid in the cathode chamber, the catholyte fluid output from the cathode chamber, and the catholyte fluid in the catholyte reservoir and control the at least one flow control device to adjust the flow rate of the catholyte fluid to be fed into the at least one of the first fluid delivery line and the second fluid delivery line electrolyte in response to a difference between the measured temperature and the temperature set point.

The present disclosure also describes an electrochemical cell for treatment of a solution by electrolysis. The electrochemical cell can comprise an inner cylindrical electrode, an outer cylindrical electrode mounted around the inner cylindrical electrode, a ceramic cylindrical diaphragm mounted in an inter-electrode space between the inner electrode and the outer electrode, the ceramic cylindrical diaphragm having a radial thickness. The radial thickness can be defined by at least one of a ratio of diaphragm thickness to a pressure within the cell of from about 0.4 to about 1.2 mm of diaphragm thickness per bar of pressure within the electrochemical cell, a ratio of diaphragm thickness to an active length of the electrochemical cell of from about 0.15 to about 1 mm of diaphragm thickness per 100 mm of length of the electrochemical cell, a ratio of diaphragm thickness to an outer diameter of the electrochemical cell of from about 0.011 to about 0.056 mm of diaphragm thickness per mm of outer diameter of the electrochemical cell, a ratio of diaphragm thickness to an inner diameter of the electrochemical cell of from about 0.015 to about 0.15 mm of diaphragm thickness per mm of inner diameter of the electrochemical cell, a ratio of diaphragm thickness to an outer diameter of the diaphragm of from about 0.014 mm to about 0.071 mm of diaphragm thickness per mm of outer diameter of the diaphragm, a ratio of diaphragm thickness to an active volume between the inner cylindrical electrode and the outer cylindrical electrode of from about 0.0025 to about 0.015 mm of diaphragm thickness per $cm^3$ of volume between the electrodes, and a ratio of diaphragm thickness to an overall volume of the electrochemical cell of from about 0.0017 to about 0.0085 mm of diaphragm thickness per cm3 of overall volume of the electrochemical cell.

These and other examples and features of the present systems and methods will be set forth in part in the following Detailed Description. This Summary is intended to provide an overview of the present subject matter, and is not intended to provide an exclusive or exhaustive explanation. The Detailed Description below is included to provide further information about the present systems and methods.

DETAILED DESCRIPTION

This disclosure describes an electrochemical activation (ECA) system for the ECA of sodium chloride solution (brine) to form a biocidal cleaning or disinfecting solution.

The ECA system can include one or more electrochemical cells each comprising an anode and a cathode separated by a diaphragm or membrane. The example ECA systems and cells of the present disclosure can provide for more consistent output of solutions produced by the ECA system and can be more energy efficient in operation.

Figure 1:
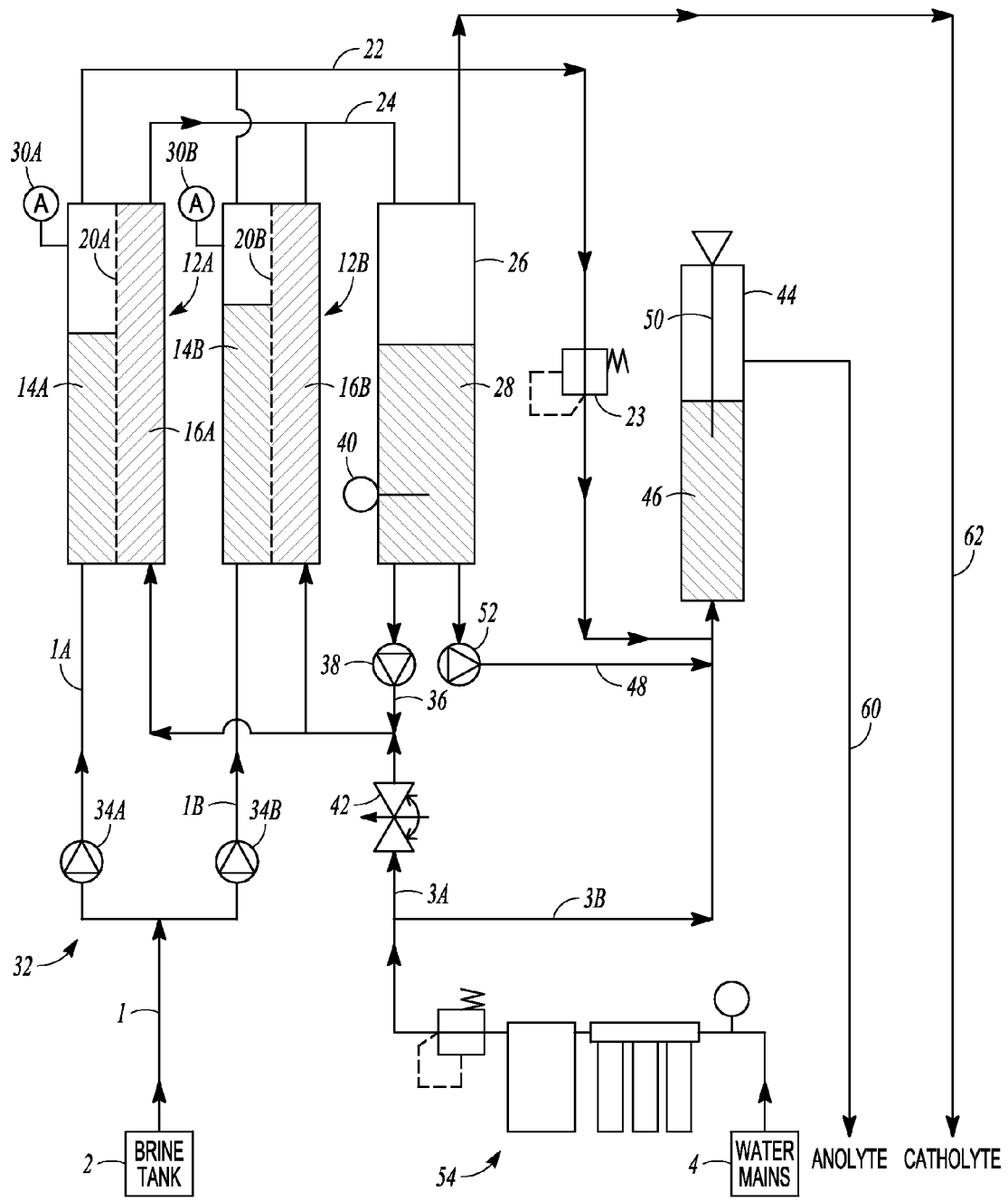
FIG. 1 is a schematic flow diagram of an example electrochemical activation device.

FIG. 1 shows a schematic flow diagram of an example ECA system 10 that can be configured to produce disinfecting or other biocidal solutions from a brine solution 1. The brine solution 1 can be fed from a brine tank 2 where the brine solution 1 can be prepared and stored. The brine solution 1 can comprise an aqueous solution of an inorganic salt. In an example, the brine solution 1 comprises an aqueous sodium chloride solution (NaCl (aq)), but other compounds can be included in the brine solution 1, including, but not limited to, sodium bromide (NaBr), potassium chloride (KCl), and calcium chloride ($CaCl_2$). For the sake of brevity, the remainder of the present disclosure will describe the chemistry involved with the electrolysis of NaCl brine solution 1. However, a person of ordinary skill in the art will recognize that similar chemistry can be involved with other compounds in the brine solution 1.

The brine solution 1 can be fed into one or more electrochemical cells 12A, 12B (collectively referred to herein as "electrochemical cell 12" or "electrochemical cells 12"). Each electrochemical cell 12 can include an anode chamber 14A, 14B (collectively referred to herein as "anode chamber 14" or "anode chambers 14") enclosing an electrical anode (not shown in FIG. 1) and a cathode chamber 16A, 16B (collectively referred to herein as "cathode chamber 16" or "cathode chambers 16") enclosing an electrical cathode (not shown in FIG. 1). Each corresponding anode chamber 14 and cathode chamber 16 are separated by a diaphragm 20A, 20B (collectively referred to herein as "diaphragm 20" or "diaphragms 20"). Electrical current can be supplied to the electrochemical cell 12 such that the current flows from the anode, through the brine solution 1 in the electrochemical cell 12, and into the cathode.

The brine solution 1 can be fed to the electrochemical cells 12, such as by being fed from a brine tank 2 into the anode chambers 14 as shown in FIG. 1. In the electrochemical cell 12, the chlorine ions can migrate to the anode where they are oxidized to form chlorine atoms. The chlorine atoms can react together to form chlorine gas, which is summarized by Half Reaction 1:

$$2Cl^- \rightarrow Cl_2(g) + 2e^- \qquad [1]$$

The chlorine gas can be drawn off from the anode chambers 14 as a chlorine gas stream 22.

In an example, the brine solution 1 is not fed into the cathode chambers 16. Rather, water 3 can be fed from a water source 4, such as a water mains 4, into the cathode chambers 16. A recirculated catholyte solution 36 (described in more detail below) can be mixed with the water 3 and fed into the cathode chambers 16, or the recirculated catholyte solution 36 can be fed into the cathode chambers 16 in place of the water 3. Water molecules can be reduced at the cathode to form hydroxyl anions and hydrogen gas in the cathodic chamber, as shown in Half Reaction 2:

$$2H_2O + 2e^- \rightarrow 2OH^- + H_2(g) \qquad [2]$$

Solution sodium ions can migrate to the negative cathode where they can interact with hydroxyl ions produced at the cathode and thus constitute the components of sodium hydroxide formed according to Half Reaction 2. Thus, as the cathodic reaction proceeds, the pH of the solution in the cathode chamber, also referred to herein as "catholyte," increases and the solution becomes increasingly basic as hydroxide concentration increases. A catholyte stream 24 can be drawn from the cathode chambers 16 and stored in a catholyte storage tank 26 as a catholyte solution 28.

As noted above, electrical current is supplied to the electrochemical cells 12 to produce anodic products (e.g., the chlorine gas stream 22 according to Reaction 1) and cathodic products (e.g., sodium hydroxide and hydrogen gas in the catholyte stream 24 according to Reaction 2). The overall rate of the electrochemical Reactions 1 and 2 can be proportional to the current flowing through the electrochemical cells 12. Therefore, the rate of electrolysis can be maintained by maintaining the current passing through the electrochemical cell 12. Thus, maintaining the current through the electrochemical cell 12 can result in a solution output having a consistently maintained desired concentration of biocidal components.

One method of controlling the cell current is to adjust the amount of brine solution 1 fed to the anode chamber 14 in order to increase or decrease the concentration of ions (e.g., sodium and chloride ions) available in the electrochemical cell 12 for electrolysis. In an example, the current of each electrochemical cell 12 can be measured with a cell current measurement device, such as a cell current meter 30A, 30B (collectively referred to herein as "cell current meter 30" or "cell current meters 30"). The cell current meters 30 can control the operation of a brine delivery system 32, e.g., so that the flow rate of the brine solution 1 fed to each electrochemical cell 12 can be adjusted according to the measured current.

The brine delivery system 32 can comprise a separate flow control for each electrochemical cell 12, e.g., a first flow control device or devices for the first electrochemical cell 12A and a second flow control device or devices for the second electrochemical cell 12B. In an example, shown in FIG. 1, the flow control device can comprise a variable flow rate pump 34A, 34B (collectively referred to herein as "pump 34" or "pumps 34"). As shown in the example of FIG. 1, a first pump 34A controls the flow of a first portion of the brine solution 1A flowing into the anode chamber 14A of the first electrochemical cell 12, and a second pump 34B controls the flow of a second portion of the brine solution 1B flowing into the anode chamber 14B of the second electrochemical cell 12.

In operation, a set point or range of set points can be provided, such as via a control system. If, for example, the current measured by a particular cell current meter 30 falls below the set point or range of set points, then a corresponding pump 34 can be configured increase the flow rate of brine solution 1 to the corresponding electrochemical cell 12. Similarly, if the current measured by the cell current meter 30 is higher than the set point or the range of set points, then the corresponding pump 34 can be configured to reduce the flow rate of brine solution 1 to the corresponding electrochemical cell 12.

In the example shown in FIG. 1, there are separate, independent cell current measurement device (e.g., a separate cell current meter 30) and a separate, independent pump 34 associated with each electrochemical cell 12. For example, a first cell current meter 30A can measure the current across the first electrochemical cell 12A. The first cell current meter 30A can send control signals to a first variable flow rate pump 34A, which can then control the flow rate of the portion of brine solution 1A being sent to the anode chamber 14A of the first electrochemical cell 12A. Similarly, a second cell current meter 30B can measure the current across the second electrochemical cell 12B. The second cell current meter 30B can send control signals to a second variable flow rate pump 34B, which can then control the flow rate of the portion of brine solution 1B being sent to the anode chamber 14B of the second electrochemical cell 12B. If a particular ECA device comprises additional electrochemical cells, such as a third electrochemical cell and a fourth electrochemical cell (not shown), then the ECA device can also include third and fourth cell current meters and third and fourth pumps.

Independent control of the brine solution flow rate to each electrochemical cell 12 of the ECA system 10 can provide for more efficient operation of the ECA system 10 and can provide for more consistent output of solutions produced from the ECA system 10, e.g., more consistent concentrations and quality. The independent control for each electrochemical cell 12 can ensure that each electrochemical cell 12 is receiving the proper input of brine solution 1 to achieve the desired output results, e.g., a desired electrochemical production rate exemplified by the current passing through the electrochemical cell 12. In contrast, for ECA devices where only an overall current among all cells is measured, or a single feed pump or feed flow control device is used to supply brine solution to all the electrochemical cells, one or more of the electrochemical cells can end up being underutilized or overutilized at any particular time. For example, if two electrochemical cells are used, a single pump or flow control device may provide adequate flow rate to a first one of the cells, but may provide either too much brine solution to a second cell (resulting in too high of current through the cell, pushing the cell too hard) or too little brine solution to the second cell (resulting in too low of current through the cell, and the second cell producing a lower concentration output of chlorine gas and sodium hydroxide than desired).

Independent control of the brine solution 1 to each electrochemical cell 12 can also provide for better detection of a malfunctioning or otherwise faulty cell 12 and can also provide for better identification of a faulty cell 12 over prior systems that did not have independent control of the brine solution feed. For example, if the first electrochemical cell 12A is faulty, but the second electrochemical cell 12B is operating normally, the supply of the brine solution 1 to the first electrochemical cell 12A will be excessive (e.g., the level of the brine solution 1 in the first electrochemical cell 12A will be higher than expected). This can occur, for example, if the amperage across the first electrochemical cell 12A is below a desired set point such that the bring solution flow control device for the first electrochemical cell 12A (e.g., the first pump 34A) will be set to increase the flow rate of the brine solution 1 to make up for the reduced amperage across the first electrochemical cell 12A. In an example, the ECA system 10 (e.g., a control system) can be configured to compare one or more parameters of each of the plurality of electrochemical cells 12 to one another and to determine that a particular electrochemical cell 12 is faulty if the difference between a first electrochemical cell 12A and one or more of the other electrochemical cells 12 is above a certain threshold. For example, if the input rate of the brine solution 1 into the first electrochemical cell 12A is greater than the input rate to the second electrochemical cell 12B by a certain percentage, the system 10 can be configured to determine that the first electrochemical cell 12A is faulty, and can produce an alarm to that effect. The ability to pinpoint exactly which electrochemical cell 12 is faulty is a particular advantage, because it can reduce the debug time when it is determined that the system 10 as a whole is not operating at a desired output.

Means other than controlling the flow rate of the brine solution 1 can be used to control the current of each electrochemical cell 12. For example, the salt concentration within the brine solution 1 (e.g., the sodium ion or the chloride ion concentration or the molar or mass concentration of NaCl in the brine solution) can be controlled. For example, for a current below a desired set point, the concentration can be increased, and for a current above a desired set point the concentration can be decreased. However, controlling concentration can be difficult, e.g., because of difficulties in predicting mixing and dissolution of the salt compounds. Therefore, it can be more desirable to control the flow rate of a brine solution having a constant or substantially constant salt concentration. In an example, the brine solution 1 comprises a saturated NaCl solution in water, e.g., a concentration of about 360 grams NaCl per liter $H_2O$.

In an example, a current set point for each individual electrochemical cell 12 can be from about 40 amps and about 75 amps, such as from about 45 amps to about 65 amps, for example from about 48 amps to about 56 amps. In an example, each electrochemical cell 12 can be controlled to have a current density of between about In an example, a current density for a given area of the anode can be from about 2800 amps per square meter ($amp/m^2$) to about 5500 $amp/m^2$, such as from about to about 3000 $amp/m^2$ to about 4700 $amp/m^2$, for example from about 3450 $amp/m^2$ to about 4000 $amp/m^2$.

As shown in the example of FIG. 1, a portion 36 of the catholyte solution 28 can be recirculated to the electrochemical cells 12. The recirculated catholyte 36 can be withdrawn from the catholyte storage tank 26 using a catholyte recirculation pump 38. In an example, a volumetric flow rate of recirculated catholyte 36 produced by the catholyte recirculation pump 38 can be equal to from about 0% of the volume of each cathode chamber 16 per minute to about 300% of the volume of each cathode chamber 16 per minute, such as from about 0% to about 75% of the volume of each cathode chamber 16 per minute.

The recirculation of the catholyte solution 36 can provide several advantages during the operation of the ECA system 10. For example, recirculation of the catholyte 36 can provide for control of the concentration of electrolytes within the electrochemical cells 12. For example, if a larger concentration of electrolytes is desired in the electrochemical cells 12, then the percentage of the catholyte solution 28 that is sent back to the electrochemical cells 12 as recirculated catholyte 36 can be increased.

Control over the concentration of electrolytes in the electrochemical cells 12 can provide for control over output concentrations and for control over the electrical resistance across the electrochemical cells 12. Control over the resistance across the cells 12 can, in turn, be used to control the current draw of the electrochemical cells 12 and the conductivity of the solution passing through the electrochemical cells 12, which, in turn, can control the brine solution level in the electrochemical cells 12. In an example, the recirculation of the catholyte solution 36 can provide for control of the concentration of electrolytes within one chamber of the electrochemical cell 12, e.g., by controlling the electrolyte concentration in each cathode chamber 16.

The recirculation of the catholyte 36 can also provide for temperature control of the electrochemical cells 12 during operation. The electrolysis of the brine solution 1 and the recirculated catholyte 36 in the electrochemical cells 12 can result in an increasing operating temperature of the electrochemical cells 12 and the output chlorine gas stream 22 and catholyte stream 24 as the ECA system 10 continues to operate. In an example, it can be desirable to control a temperature of the recirculated catholyte 36 being fed into the electrochemical cells 12 in order to control the operation temperature of the electrochemical cells 12. The example ECA system 10 can include means for controlling the temperature of the recirculated solution being fed back into the electrochemical cells 12, which includes the recirculated catholyte 36. The ECA system 10 can include a temperature sensor 40 to measure a temperature of the catholyte solution 28 or of the recirculated catholyte 36. The temperature sensor 40 can be used to measure the temperature of the catholyte solution 28 within the catholyte storage tank 26, as shown in the example of FIG. 1, or the temperature sensor 40 can measure a temperature of the recirculated catholyte 36, such as by being included on a line through which the recirculated catholyte 36 flows.

The temperature sensor 40 can send a control signal to one or both of a flow control device for controlling the flow rate of recirculated catholyte 36 out of the catholyte storage tank 26, such as a variable flow rate recirculation pump 38, and a flow control device for controlling the flow rate of fluid being fed to one of the anode chamber 14 or the cathode chamber 16 of the electrochemical cells 12, such as a water flow control valve 42 that can control the flow rate of water 3A from the water mains 4 to be mixed into the recirculated catholyte 36 before it is fed into the electrochemical cells 12. The water flow control valve 42 can control the flow rate of water 3A that is mixed into the recirculated catholyte 36 based on the temperature readings made by the temperature sensor 40. For example, if the temperature sensor 40 measures the temperature as being higher than a desired set point or range of set points, the water flow control valve 42 can allow a higher flow rate of water 3A (which will tend to have a temperature that is cooler than the temperature of the recirculated catholyte 36) to mix with the recirculated catholyte 36 in order to cool the recirculated catholyte 36 before it is fed into the electrochemical cells 12. If the temperature sensor 40 measures the temperature as being below a desired set point or range of set points, the water flow control valve 42 can allow a lower flow rate of water 3A to mix with the recirculated catholyte 36 so that the recirculated catholyte 36 that is fed into the electrochemical cells 12 is less cool than it was before adjusting the water 3A flow rate.

In an example, a desired set point for the temperature of the catholyte solution 28 is from about 40° C. to about 70° C., such as from about 50° C. to about 60° C., such as about 55° C.

The chlorine gas stream 22 can be mixed with a water stream 3B and fed into an anolyte processing tank 44, where the chlorine gas 22 can be dissolved and reacted with the water 3B to produce an anolyte solution 46. The anolyte solution 46 can include hypochlorous acid and hydrochloric acid, produced according to Reaction 3:

$$Cl_2 + H_2O \rightarrow HOCl + HCl \qquad [3]$$

Hypochlorous acid (HOCL) is a strong oxidant that can be used in a biocidal solution, for example as a disinfectant or for water sanitizing. The free (dissolved) chlorine in the water stream 3B and anolyte solution 46 can include one or more of dissolved chlorine, hypochlorous acid, and hypochlorite ions, depending on the pH, but can also include varying amounts of other species including, but not limited to, ozone and chlorine dioxide.

A chlorine gas pressure regulating valve 23 can be included on the chlorine gas stream 22 to insure that the chlorine gas is being fed to the anolyte processing tank 44 at a sufficient pressure to maintain a desired production of the anolyte solution 46. In an example, the chlorine pressure regulating valve 23 can control the pressure of the chlorine gas stream 22 to be from about 15 kilopascal (kPa) (about 0.15 bar) to about 150 kPa (about 1.5 bar), such as about 60 kPa (about 0.6 bar).

As the anolyte solution 46 becomes more acidic due to the formation of hypochlorous acid and hydrochloric acid, Reaction 3 becomes less favored such that the chlorine gas instead dissolves in the water without undergoing subsequent hydrolysis. However, the solubility of chlorine in water is limited and off gas of chlorine will occur once the solubility threshold is exceeded. At higher pH values, an equilibrium between hypochlorous acid and hypochlorite ion can be established with an acid dissociation constant of about 6.8.

In order to maintain the higher pH values that can achieve this equilibrium, a portion 48 of the catholyte solution 28 can be drawn from the catholyte storage tank 26 and mixed with the water stream 3B. As noted above, the catholyte solution 28 comprises hydroxyl ions that were formed as part of Reaction 2, and thus has a relatively high pH, such as from about 11.5 to about 13.7. In an example, shown in FIG. 1, a pH probe 50 can measure a resulting pH of the anolyte solution 46, such as by being positioned on anolyte processing tank 44 in order to measure a pH of the anolyte solution 46 within the tank 44.

A variable flow rate pump 52 can be provided to control the flow rate of the catholyte solution 48 that is to be used for pH correction. Alternatively, another flow control device or devices, such as a flow control valve, can be used to control the flow rate of the catholyte solution 48 that is mixed with the water stream 3B. In an example, the pump 52 or other flow control device or devices can be controlled based on the pH reading from the pH probe 50. For example, if the pH of the anolyte solution 46 is measured as being too acidic, e.g., a pH that is too low, then the pump 52 can begin pumping or can increase the flow rate of the catholyte solution 48 to be mixed with the water stream 3B and the chlorine gas stream 22. If the anolyte solution 46 is measured as being too basic, e.g., a pH that is too high, then the pump 52 can reduce the flow rate or cease pumping the catholyte solution 48. In an example, a pH set point for the anolyte solution 46 can be from about a pH of 5 to about a pH of 8, such as a pH of about 7.

One consideration for the production of a consistent output solution is the condition and consistency of the inputs, e.g., the water, the salts, and the electricity into the electrochemical cells 12. Consistent electrical input, in the form of the independent control of the brine solution 1 feed rate into each of the plurality of electrochemical cells 12, is discussed above. The salts that are used to make the brine solution are generally available at a standard that is sufficient for consistent electrochemical operation of the ECA system 10. Water quality, however, can vary substantially depending on geographic region and the forms of processing that the local water undergoes (e.g., chemical treatment, filtration, softeners, etc.).

Electrochemical devices such as the ECA system 10, and particularly the electrochemical cells 12, can be sensitive to contaminants in the supply water 3. For example, contamination in the form of "hard water" (e.g., water with a high mineral content, particularly of calcium and magnesium ions, but can also include counterions such as bicarbonates and sulphates). In particular, hard water can result in mineral deposits on the diaphragms 20 within the electrochemical cells 12, which can cause a change in the permeability of the diaphragms 20 and an overall decreased efficiency of the electrochemical cells 12 and eventual failure of the ECA system 10. Hard water can also result in scale buildup or other deposits, such as magnesium or calcium, or both, on the cathode, reducing the surface area available for electrolysis.

Therefore, it can be desirable to pretreat or precondition the water 3 from the water mains 4. For example, the water 3 can be subjected to one or more of filtration, softening, reverse osmosis, and the like. In an example, water 3 from the water mains 4 can be sent through a water-conditioning system 54, sometimes also referred to as a water-softening system. The water-conditioning system 54 can remove undesirable ions from the water 3 in order to supply conditioned water 3 to the ECA system 10.

The anolyte solution 46 can be removed from the anolyte processing tank 44 via an anolyte product line 60. Similarly, a portion of the catholyte solution 28 can be removed from the catholyte storage tank 26 via a catholyte product line 62. Anolyte product from the anolyte product line 60 and catholyte product from the catholyte product line 62 can be combined in various combinations and ratios, along with other additives such as color, scents, moisturizing agents, stabilizing agents, gelling agents, surfactants, foaming agents, pH stabilizers, antioxidant agents, and the like, to form a cleaning or disinfecting solution. Examples of types of cleaning or disinfecting solutions that can be made depending on the ratio of the anolyte and the catholyte used, along with other additives, include, but are not limited to, a hand sanitizer, a hard surface sanitizer, an all-purpose cleaner, a disinfecting spray (such as a fogging disinfectant spray), a wound care solution, a dental wash, a veterinary or animal husbandry disinfecting solution, a horticultural solution, and a disinfectant ice.

FIGS. 2-5 show various details of an example electrochemical cell 100 that can be used as part of an ECA device. For example, the example electrochemical cell 100 shown in FIGS. 2-5 can be incorporated into the ECA system 10 of FIG. 1 as either of the electrochemical cells 12A, 12B.

Figure 3:
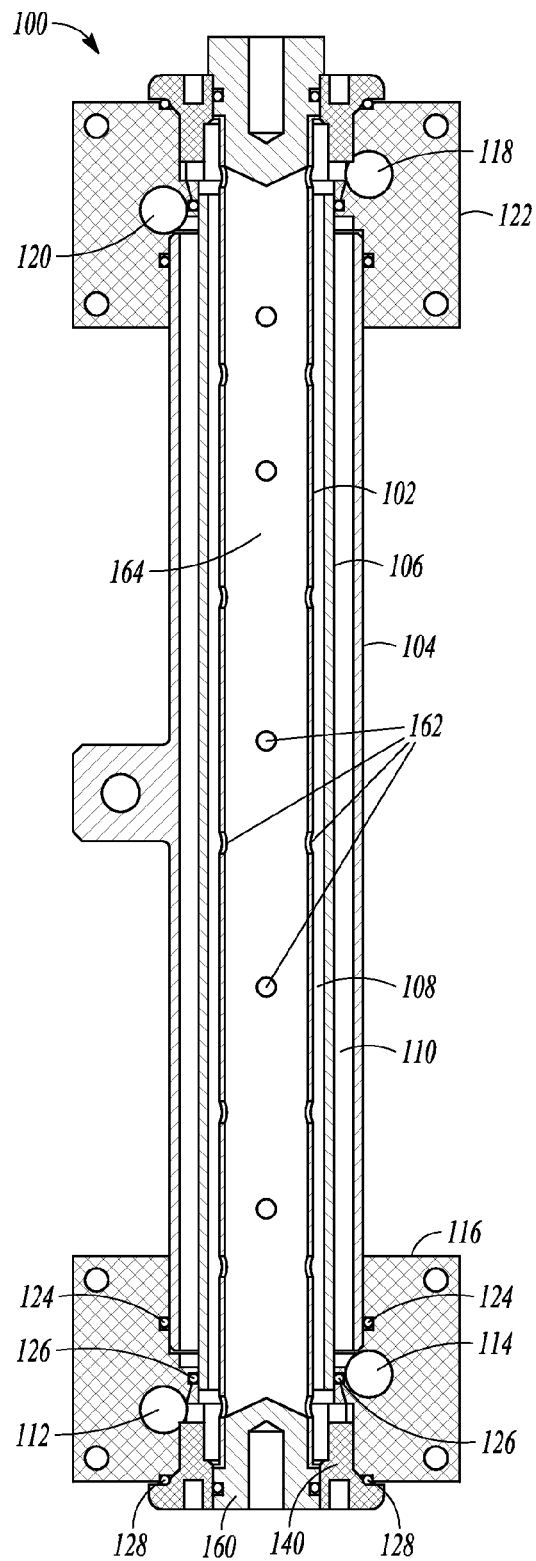
FIG. 3 is a cross-sectional view of the example electrochemical cell shown in FIG. 2.

The example electrochemical cell 100 includes a pair of electrodes 102, 104 (FIG. 3). The electrodes 102, 104 are separated by an ion-permeable diaphragm 106, e.g., to allow for the passage of sodium ions ($Na^+$) and chloride ions ($Cl^-$) from a brine solution fed to the electrochemical cell 100 or hydroxyl ions ($OH^-$) or other ions that can be formed by the electrolysis reactions described above). In an example, the electrodes 102, 104 and the diaphragm 106 can be concentric or substantially concentric cylinders, such as ovular or circular cylinders.

The electrodes 102, 104 can be configured so that a first one of the electrodes 102, 104 are configured to be an anode and the other electrode 102, 104 can be configured to be the cathode. In an example, the inner electrode 102 can be configured as the anode, and the outer electrode 104 can be configured as the cathode. For the sake of brevity, the remainder of this description will refer to the inner electrode 102 as the anode 102 and will refer to the outer electrode 104 as the cathode 104. A person of ordinary skill in the art will recognize that the electrodes 102, 104 can be switched.

The space between the anode 102 and the diaphragm 106 can be referred to as the anode chamber 108 and the space between the cathode 104 and the diaphragm 106 can be referred to as the cathode chamber 110. In an example, the diaphragm 106 comprises a sorbent material, such as a ceramic (as described in more detail below), and can therefore also allow some fluid to pass through between the chambers 108, 110.

An anode chamber inlet 112 can be in fluid communication with an inlet end of the anode chamber 108 and with an inlet line (such as the brine solution inlets 1A, 1B shown in FIG. 1). The anode chamber inlet 112 can provide a flow path for solution, such as the brine solution 1A, 1B, to the anode chamber 108 to allow for electrolysis of the solution. A cathode chamber inlet 114 can be in fluid communication with and inlet end of the cathode chamber 110 and with an inlet line (such as the water inlet lines 3A shown in FIG. 1). The cathode chamber inlet 114 can provide a flow path for a solution, such as water 3A, to the cathode chamber 110. The anode chamber inlet 112 and the cathode chamber inlet 114 can be formed in an inlet end cap 116.

An anode chamber outlet 118 can be in fluid communication with an outlet end of the anode chamber 108 and with an outlet line (such as the chlorine gas stream 22 shown in FIG. 1). The anode chamber outlet 118 can provide a flow path for the products formed in the anode chamber 108, e.g., for the chlorine gas formed via Reaction 1. A cathode chamber outlet 120 can be in fluid communication with an outlet end of the cathode chamber 110 and with an outlet line (such as catholyte stream 24 shown in FIG. 1). The cathode chamber outlet 120 can provide a flow path for products formed in the cathode chamber 110, e.g. for sodium hydroxide formed from the sodium ions from the brine solution 1 and hydroxyl ions formed via Reaction 2, as well as for unreacted solution. The anode chamber outlet 118 and the cathode chamber outlet 120 can be formed in an outlet end cap 122.

The end caps 116, 122 can hold and support the electrodes 102, 104 and the diaphragm 106 in their desired positions. As noted above, the end caps 116, 122 can include inlet passageways and outlet passageways, such as the inlet passageways 112, 114 formed in the inlet end cap 116 and the outlet passageways 118, 120 formed in the outlet end cap 122. The end caps 116, 122 can also include a sealing mechanism for sealing the electrodes 102, 104 and the diaphragm 106 against fluid leakage so that input solutions (e.g., the brine solution 1A, 1B and water 3A inlets in FIG. 1) and output solutions (e.g., the chlorine gas stream 22 and the catholyte stream 24 in FIG. 1) will each flow from an inlet passageway 112, 114 into a desired corresponding chamber 108, 110 and will flow from each chamber 108, 110 into a desired corresponding outlet passageway 118, 120.

Figure 4:
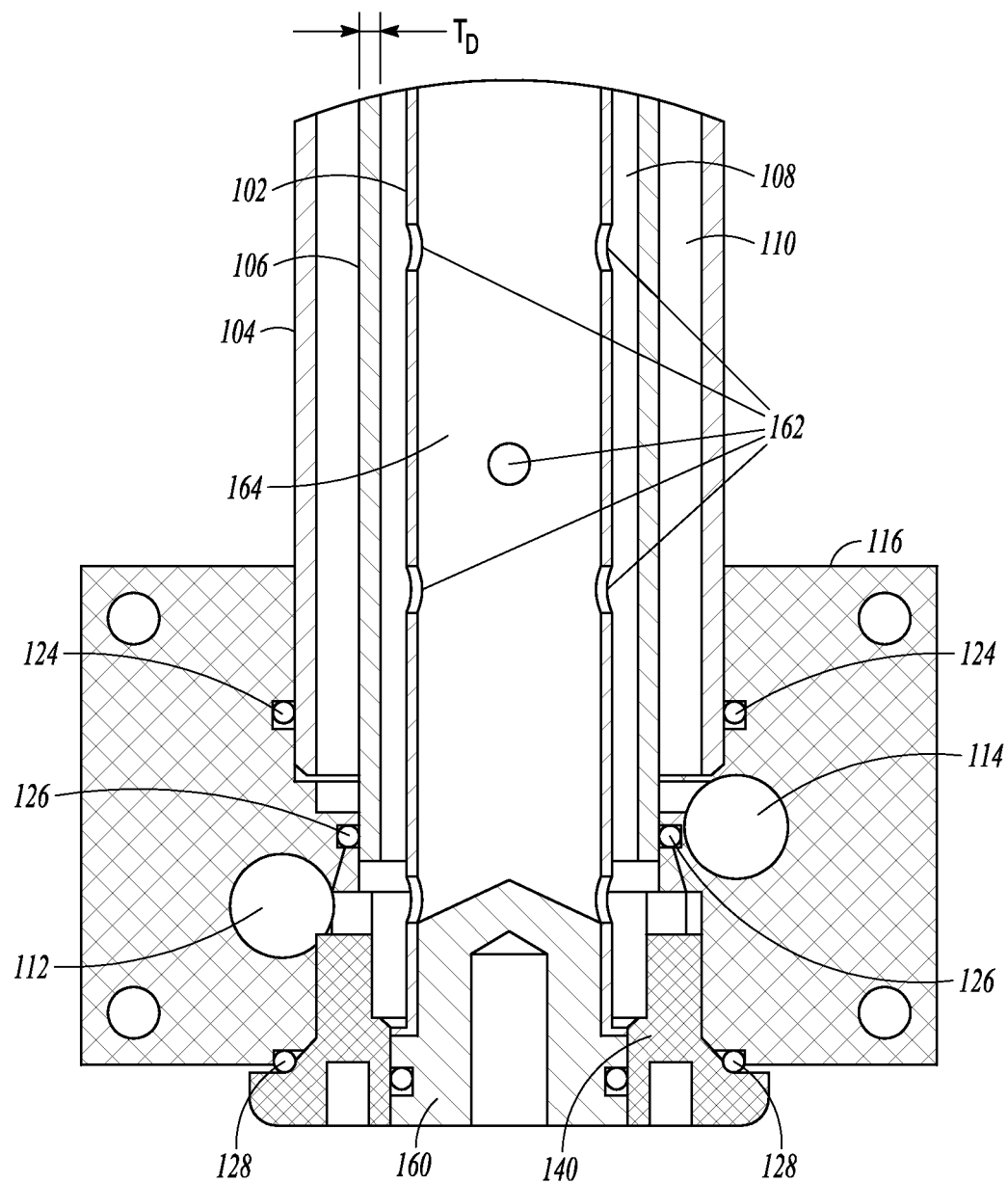
FIG. 4 is a cross-sectional detailed view of an example end cap of the example electrochemical cell.

In the example best seen in FIG. 4, the sealing mechanism can include one or more O-ring seals, such as the plurality of O-rings 124, 126, 128. In the example shown in FIG. 4, a first O-ring 124 can form a seal between the inlet end cap 116 and the cathode 104, such as between an inner surface 130 of the inlet end cap 116 and an outer surface 132 of the cathode 104. The first O-ring 124, also referred to herein as a "cathode O-ring 124," can provide a fluid seal at the radially-outward extent of the cathode chamber 110, e.g., so that a cathode inlet solution, such as the water 3A in FIG. 1, is prevented or substantially prevented from leaking outside of the cathode chamber 110. The cathode O-ring 124 can be positioned within a groove, such as the groove 134 in the inner surface 130 of the inlet end cap 116.

A second O-ring 126 can form a seal between the inlet end cap 116 and the diaphragm 106, such as between the inner surface 136 of the inlet end cap 116 and an outer surface 138 of the diaphragm 106. The second O-ring 126, also referred to herein as a "diaphragm O-ring 126," can provide a fluid seal at the radially-inward extent of the cathode chamber 110 and/or at the radially-outward extent of the anode chamber 108, e.g., so that solution does not bypass the diaphragm 106. Thus, the diaphragm O-ring 126 can prevent or substantially prevent catholyte inlet solution (water 3A) leaking from the cathode chamber 110 into the anode chamber 108 without passing through the diaphragm 106. The diaphragm O-ring 126 can also prevent or substantially prevent anolyte inlet solution (e.g., brine solution 1) from leaking from the anode chamber 108 to the cathode chamber 110 without passing through the diaphragm 106. The diaphragm O-ring 126 can be positioned in a groove, similar to the groove 134 in the inner surface 130 of the inlet end cap 116. Alternatively, as shown in FIG. 4, the diaphragm O-ring 126 can be positioned between the inlet end cap 116, the diaphragm 106, and a sealing plug 140, described in more detail below, can provide for a sealing force to be applied to the diaphragm 126.

A third O-ring 128 can form a seal between the inlet end cap 116 and the sealing plug 140, such as between the inner surface 142 of the inlet end cap 116 and an outer surface 144 of the sealing plug 140. The third O-ring 128 can also be configured to form a seal between the inlet end cap 116 and the anode 102 (not shown). The third O-ring 128, also referred herein as the "anode O-ring 128," can provide a fluid seal between the inlet end cap 116 and the anode 102, such as by providing a seal between the inlet end cap 116 and the sealing plug 140 to prevent or substantially prevent fluid from leaking from the anode chamber 108 outside of the electrolytic cell 100. The anode O-ring 128 can be positioned between the inlet end cap 116 and the sealing plug 140, such as in a groove 146 within the inlet end cap 116.

As noted above, a sealing plug 140 can be included to provide for sealing at the end cap 116, such as via the o-ring seals 124, 126, 128 described above. The sealing plug 140 can include threading 150 that can engage with corresponding threading 152 on the end cap 116, as best seen in FIG. 4. The threading 150, 152 can allow the sealing plug 140 to be securely engaged with the end cap 116. The threading 150, 152 can also provide for an axially-directed force (e.g., upward in FIG. 4) that can be exerted against one or more of the sealing o-rings 124, 126, 128. For example, as the threading 150 on the sealing plug 140 engages the threading 152 on the end cap 116, the sealing plug 140 can be driven axially toward the cell 100 (e.g., upward in FIG. 4). In the example shown in FIG. 4, the sealing plug 140 can be axially driven into the diaphragm o-ring 126 and the anode o-ring 128 which can compress the o-rings 126, 128. For example the diaphragm o-ring 126 can be pressed into the chamfered inner surface 136 of the end cap 116 and the outer surface 138 of the diaphragm 106 by the compressing force of the axially driven sealing plug 140. Similarly, the anode o-ring 128 can be pressed into the chamfered outer surface 144 of the sealing plug 140 and the inner surface 142 of the end cap 116 by the compressing force of the axially driven sealing plug 140.

An anode sealing plug 160 can also be included to provide for sealing at the end cap 116. In the example shown in FIG. 4, the anode sealing plug 160 can be coupled to the anode 102 and to the sealing plug 140. The coupling between the anode sealing plug 160 and the anode 102 can be such that a seal is formed between the anode sealing plug 160 and the anode 102 so that no fluid can pass between them. Similarly, the coupling between the anode sealing plug 160 and the sealing plug 140 can be such that a seal is formed between the anode sealing plug 160 and the sealing plug 140 so that no fluid can pass between them.

A similar sealing mechanism can be included for the outlet end cap 122. For example, the outlet end cap 122 can include one or more O-ring seals, arranged in a similar manner to O-rings 124, 126, 128 for the inlet end cap 116, as described above, that can seal between the outlet end cap 122 and the electrodes 102, 104 and the diaphragm 106.

The diaphragm 106 can be made from any material that can allow ions to pass between the chambers 108, 110 across the diaphragm 106, e.g., so that the diaphragm 106 can act as an ion-permeable membrane.

In an example, the diaphragm 106 comprises a ceramic-based membrane material that can allow for the ions to pass between the chambers 108, 110. Examples of materials that can be used to form a ceramic diaphragm 106 can include, but are not limited to, a ceramic material based on an aluminum oxide, such as a zirconia-toughened alumina ceramic. An alumina-only ceramic is possible for the diaphragm 106, but the addition of a portion of at least one of zirconium oxide and yttrium oxide, and preferably both zirconium oxide and yttrium oxide, can provide strength to the diaphragm 106 compared to an aluminum oxide-only diaphragm. In an example, the diaphragm 106 can include an alumina-base ceramic that has been toughened by zirconia with a yttrium base (e.g., zirconia that has been stabilized by yttrium when the zirconia is being tempered). The diaphragm 106 could also comprise non-ceramic based materials, including, but not limited to, a plastic or other polymer, a metallic membrane, a coated metallic membrane, and a clay-based membrane. In an example, a plastic diaphragm 106 comprises a sorbent or porous plastic material that is also an electrical conductor, such as a plastic ion-inducting membrane.

In the example of a ceramic-based diaphragm 106, the diaphragm 106 has a thickness $T_D$ in a radial direction (FIG. 4) that is selected to provide for an optimized diffusion rate of ions through the diaphragm 106 while still providing sufficient structural strength to withstand the fluid pressure produced by the solutions flowing into and through the chambers 108, 110.

The thickness of the diaphragm 106 can be selected based on one or more dimensions or operating parameters of the electrochemical cell 100, e.g., as a ratio between the thickness $T_D$ and another parameter. For example, the thickness of the diaphragm 106 relative to various physical dimensions of the electrochemical cell 100 (such as diameters of generally cylindrical cells), or relative to a pressure within the electrochemical cell 100, or both, can be described by one or more of the following formulas:

1. Diaphragm thickness relative to the pressure within the cell. In an example, this ratio has a value of from about 0.4 to about 2 mm of diaphragm thickness per bar of pressure within the electrochemical cell 100, such as from about 1.2 to about 1.6 mm per bar of pressure, for example about 1.5 mm of diaphragm thickness per bar of pressure.
2. Diaphragm thickness relative to the active length of the electrochemical cell 100. In an example, this ratio has a value of from about 0.15 to about 1 mm per 100 mm of overall length of the electrochemical cell 100, such as from about 0.5 to about 0.7 mm per 100 mm of the length of the electrochemical cell 100, for example, about 0.65 mm of thickness per 100 mm of length of the electrochemical cell 100.
3. Diaphragm thickness relative to an outer diameter of the electrochemical cell 100, e.g., the inner diameter of the outermost electrode 104 (described in the examples above as the cathode 104). In an example, this ratio has a value of from about 0.011 to about 0.056 mm of thickness per mm of cell diameter, such as from about 0.03 to about 0.045 mm of diaphragm thickness per mm of cell diameter, for example about 0.04 mm of diaphragm thickness per mm of cell outer diameter.
4. Diaphragm thickness relative to an inner diameter of the electrochemical cell 100, e.g., the outer diameter of the innermost electrode 102 (described in the examples above as the anode 102). In an example, this ratio has a value of from about 0.015 to about 0.15 mm of thickness per mm of cell diameter, such as from about 0.05 mm to about 0.085 mm of diaphragm thickness per mm of cell diameter, for example about 0.079 mm of diaphragm thickness per mm of cell inner diameter.
5. Diaphragm thickness relative to the outer diameter of the diaphragm 106. In an example, this ratio is from about 0.014 to about 0.071 mm of diaphragm thickness per mm of diaphragm outer diameter, such as from about 0.04 to about 0.06 mm of diaphragm thickness per mm of diaphragm outer diameter, for example about 0.054 mm of diaphragm thickness per mm of diaphragm outer diameter.

6. Diaphragm thickness relative to an active volume of the electrochemical cell 100 between the electrodes 102, 104 (e.g., the volume between the inner diameter of the outer electrode 104 and the outer diameter of the inner electrode 102, without the volume of the diaphragm). In an example, this ratio is from about 0.0025 to about 0.015 mm of diaphragm thickness per cubic centimeter ($cm^3$) of volume between the electrodes 102, 104, such as from about 0.0085 to about 0.011 mm of diaphragm per $cm^3$ of volume between the electrodes 102, 104, for example about 0.01 mm of diaphragm thickness per $cm^3$ of volume between the electrodes 102, 104.

7. Diaphragm thickness relative to the overall volume of the electrochemical cell 100 (e.g., the volume within the inner diameter of the outer electrode 104). In an example, this ratio is from about 0.0017 to about 0.0085 mm of diaphragm thickness per $cm^3$ of volume between the electrochemical cell 100, such as from about 0.005 to about 0.0068 mm of diaphragm per $cm^3$ of volume of the electrochemical cell 100, for example about 0.0064 mm of diaphragm thickness per $cm^3$ of volume of the electrochemical cell 100.

The thickness of the diaphragm 106 can be defined as a combination of two or more of the ratios described above. For example, combinations of two of the ratios can include: diaphragm thickness per pressure and per overall length of the electrochemical cell 100; diaphragm thickness per pressure and per outer diameter of the electrochemical cell 100; diaphragm thickness per pressure and per inner diameter of the electrochemical cell 100; diaphragm thickness per pressure and per outer diameter of the diaphragm 106; diaphragm thickness per pressure and per volume between the electrodes 102, 104; diaphragm thickness per pressure and per overall volume of the electrochemical cell 100; diaphragm thickness per overall length of the electrochemical cell 100 and per outer diameter of the electrochemical cell 100; diaphragm thickness per overall length of the electrochemical cell 100 and per inner diameter of the electrochemical cell 100; diaphragm thickness per overall length of the electrochemical cell 100 and per outer diameter of the diaphragm 106; diaphragm thickness per overall length of the electrochemical cell 100 and per volume between the electrodes 102, 104; diaphragm thickness per overall length of the electrochemical cell 100 and per overall volume of the electrochemical cell 100; diaphragm thickness per outer diameter of the electrochemical cell 100 and per inner diameter of the electrochemical cell 100; diaphragm thickness per outer diameter of the electrochemical cell 100 and per outer diameter of the diaphragm 106; diaphragm thickness per outer diameter of the electrochemical cell 100 and per volume between the electrodes 102, 104; diaphragm thickness per outer diameter of the electrochemical cell 100 and per overall volume of the electrochemical cell 100; diaphragm thickness per inner diameter of the electrochemical cell 100 and per outer diameter of the diaphragm 106; diaphragm thickness per inner diameter of the electrochemical cell 100 and per volume between the electrodes 102, 104; diaphragm thickness per inner diameter of the electrochemical cell 100 and per overall volume of the electrochemical cell 100; diaphragm thickness per outer diameter of the diaphragm 106 and per volume between the electrodes 102, 104; diaphragm thickness per outer diameter of the diaphragm 106 and per overall volume of the electrochemical cell 100; or diaphragm thickness per volume between the electrodes 102, 104 and per overall volume of the electrochemical cell 100. Combinations of three or more of the ratios described above can also be used to define the diaphragm 106.

Figure 5:
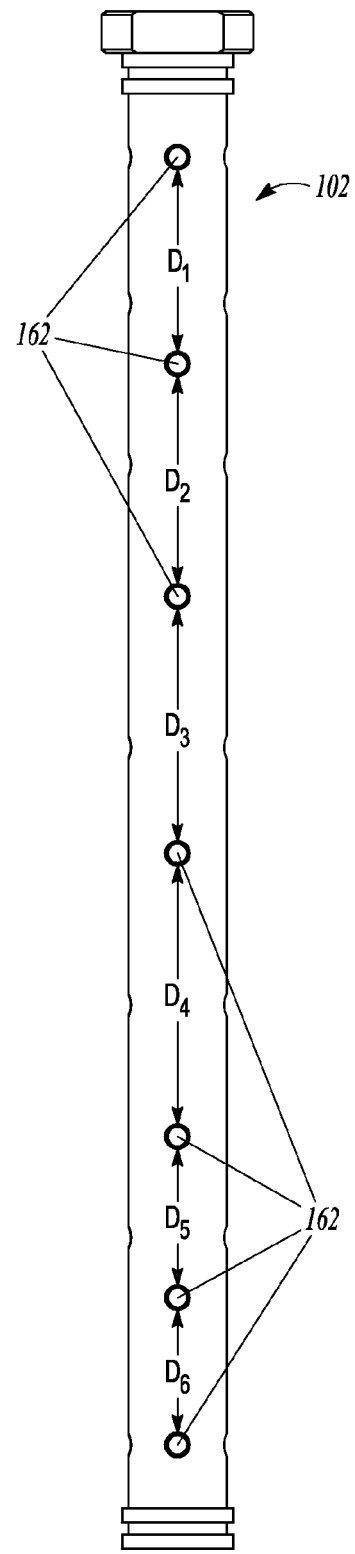
FIG. 5 is a side view of an example anode that can be used in the example electrochemical cell shown in FIGS. 2-4.

As shown in FIG. 3, the anode 102 can be included as the innermost electrode of the cell 100. Also as shown in FIG. 3, the anode 102 can comprise a generally hollow cylindrical tube. The anode 102 can include a plurality of holes 162 that allow fluid to pass from an interior bore 164 within the anode 102 to the anode chamber 108 between the anode 102 and the diaphragm 106. In an example, best seen in FIG. 5, the holes 162 can be unevenly distributed an unevenly spaced along an axial length of the anode 102. For example, a first distance $D_1$ between a first hole 162A and a second hole 162B, a second distance $D_2$ between the second hole 162B and a third hole 162C, a third distance $D_3$ between the third hole 162C and a fourth hole 162D, a fourth distance $D_4$ between the fourth hole 162D and a fifth hole 162E, a fifth distance $D_5$ between the fifth hole 162E and a sixth hole 162F, and a sixth distance $D_6$ between the sixth hole 162F and a seventh hole 162H. As can be seen in FIG. 5, no two of the distances $D_1$, $D_2$, $D_3$, $D_4$, $D_5$, $D_6$ is the same. For example, the first distance $D_1$ is smaller than the second distance $D_2$, which in turn is smaller than the third distance $D_3$, which is smaller than the fourth distance $D_4$, while the fifth distance $D_5$ is smaller than each of the first four distances $D_1$, $D_2$, $D_3$, $D_4$, and the sixth distance $D_6$ is even smaller than the fifth distance $D_5$.

Figure 6:
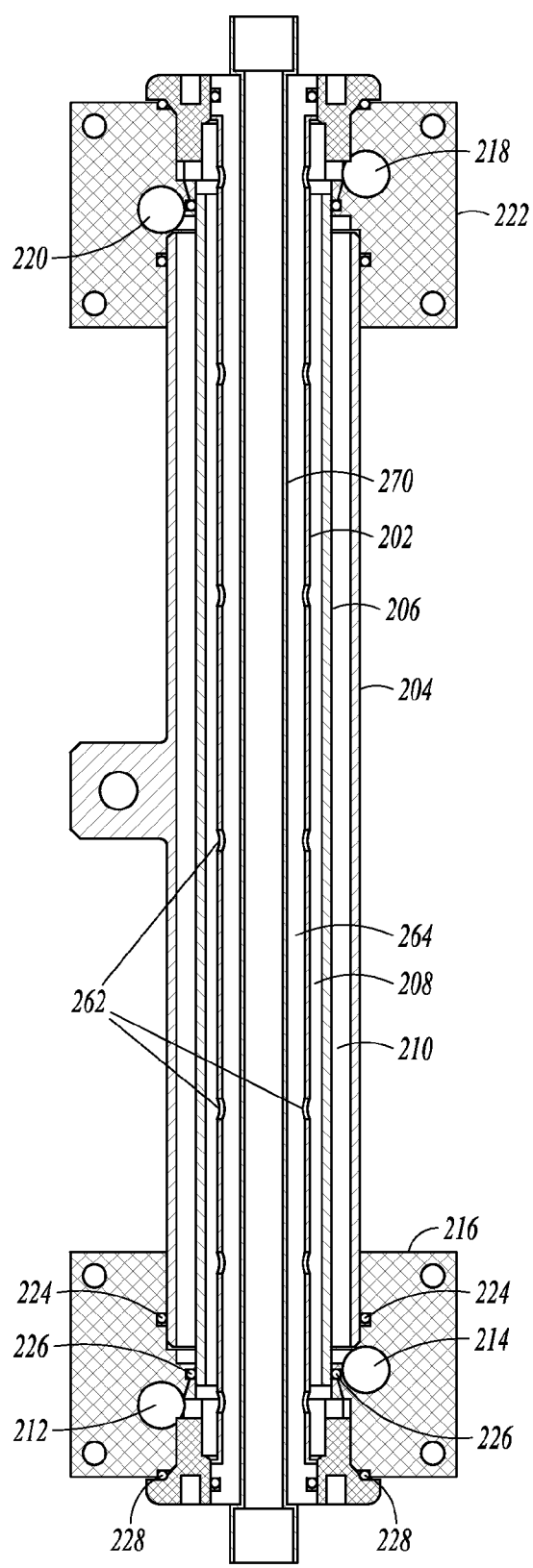
FIG. 6 is a cross-sectional view of another example electrochemical cell.

FIG. 6 shows an alternative electrochemical cell 200 that can be used as part of an ECA device. For example, the example electrochemical cell 200 shown in FIG. 6 can be incorporated into the ECA system 10 of FIG. 1 as either of the electrochemical cells 12A, 12B. The electrochemical cell 200 is similar to the electrochemical cell 100 shown in FIGS. 2-4, and like reference numbers in cell 200 denote similar structures to those in cell 100. For example, the electrochemical cell 200 includes a pair of electrodes 202, 204 in the form of an inner anode 202 and an outer cathode 204. The electrodes 202, 204 can be separated by an ion-permeable diaphragm 206 that can separate the cell 200 into an anode chamber 208 and a cathode chamber 210. In an example, the electrodes 202, 204 and the diaphragm 206 can be concentric or substantially concentric cylinders, such as ovular or circular cylinders.

An anode chamber inlet 212 can be in fluid communication with an inlet end of the anode chamber 208 and with an inlet line (such as the brine solution inlets 1A, 1B shown in FIG. 1). The anode chamber inlet 212 can provide a flow path for solution, such as the brine solution 1A, 1B, to the anode chamber 208 to allow for electrolysis of the solution. A cathode chamber inlet 214 can be in fluid communication with and inlet end of the cathode chamber 210 and with an inlet line (such as the water inlet lines 3A shown in FIG. 1). The cathode chamber inlet 214 can provide a flow path for a solution, such as water 3A, to the cathode chamber 210. The anode chamber inlet 212 and the cathode chamber inlet 214 can be formed in an inlet end cap 216.

An anode chamber outlet 218 can be in fluid communication with an outlet end of the anode chamber 208 and with an outlet line (such as the chlorine gas stream 22 shown in FIG. 1). The anode chamber outlet 218 can provide a flow path for the products formed in the anode chamber 208, e.g., for the chlorine gas formed via Reaction 1. A cathode chamber outlet 220 can be in fluid communication with an outlet end of the cathode chamber 210 and with an outlet line (such as catholyte stream 24 shown in FIG. 1). The cathode chamber outlet 220 can provide a flow path for products formed in the cathode chamber 210, e.g. for sodium hydroxide formed from the sodium ions from the brine solution 1 and hydroxyl ions formed via Reaction 2, as well as for unreacted solution. The anode chamber outlet 218 and the cathode chamber outlet 220 can be formed in an outlet end cap 222.

The electrochemical cell 200 can include a sealing mechanism to seal each end cap 216, 218, such as a set of seals, for example o-ring seals 224, 226, and 228, along with sealing plugs 240 and 260 to seal the cell 200 and prevent or reduce leaking of solution from the cell 200.

Figure 2:
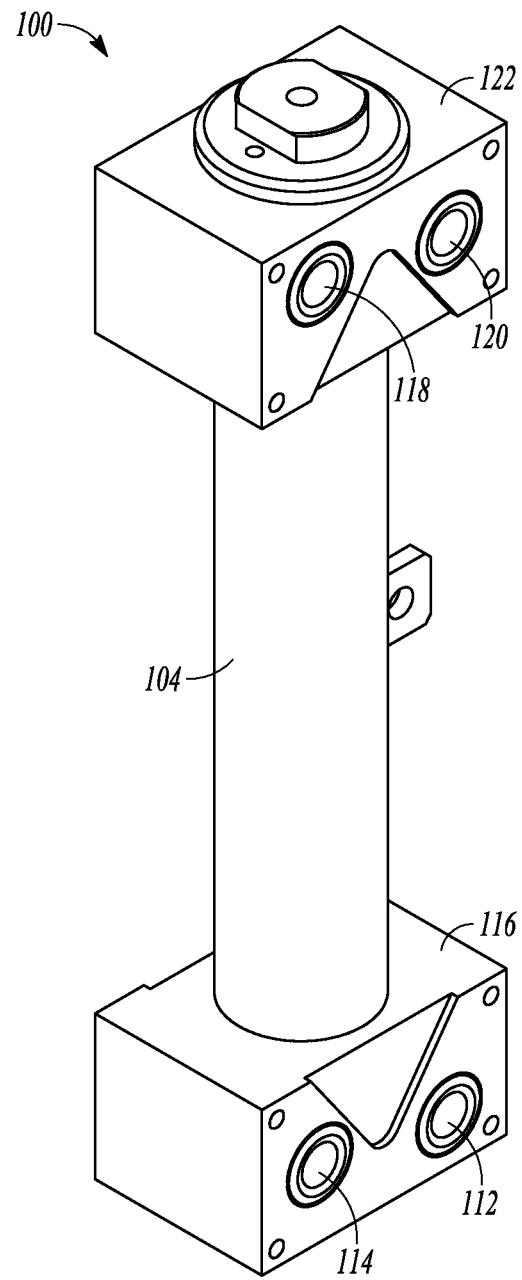
FIG. 2 is a perspective view of an example electrochemical cell.

The primary difference between the electrochemical cell 100 shown in FIGS. 2-4 and the electrochemical cell 200 shown in FIG. 6 is the inclusion of a cooling mechanism in the electrochemical cell 200 to provide for cooling of one or more of the solutions within one or more of the anode chamber 208 and the cathode chamber 210. As shown in the example of FIG. 6, the electrochemical cell 200 can include a cooling tube 270 that passes through the interior bore 264 of the anode 202. A cooling fluid can be sent through the cooling tube 270 in order to cool the solution within the bore 264 and the anode chamber 208 (which is in fluid communication with the bore 264 through the plurality of holes 262). Alternatively, the cooling tube 270 can be configured as a heating tube, e.g., with a heat-transfer fluid passing through the tube 270 to heat the fluids within the cell 200.

In an example, the cooling tube 270 can be a cylinder that is substantially concentric with one or more of the anode 202, the cathode 204, and the diaphragm 206. The cooling tube 270 can be passed through the anode sealing plug 260 and coupled thereto. The coupling between the anode sealing plug 260 and the cooling tube 270 can be such that a seal is formed therebetween so that no fluid can pass between the cooling tube 270 and the anode sealing plug 260.

Figure 7A:
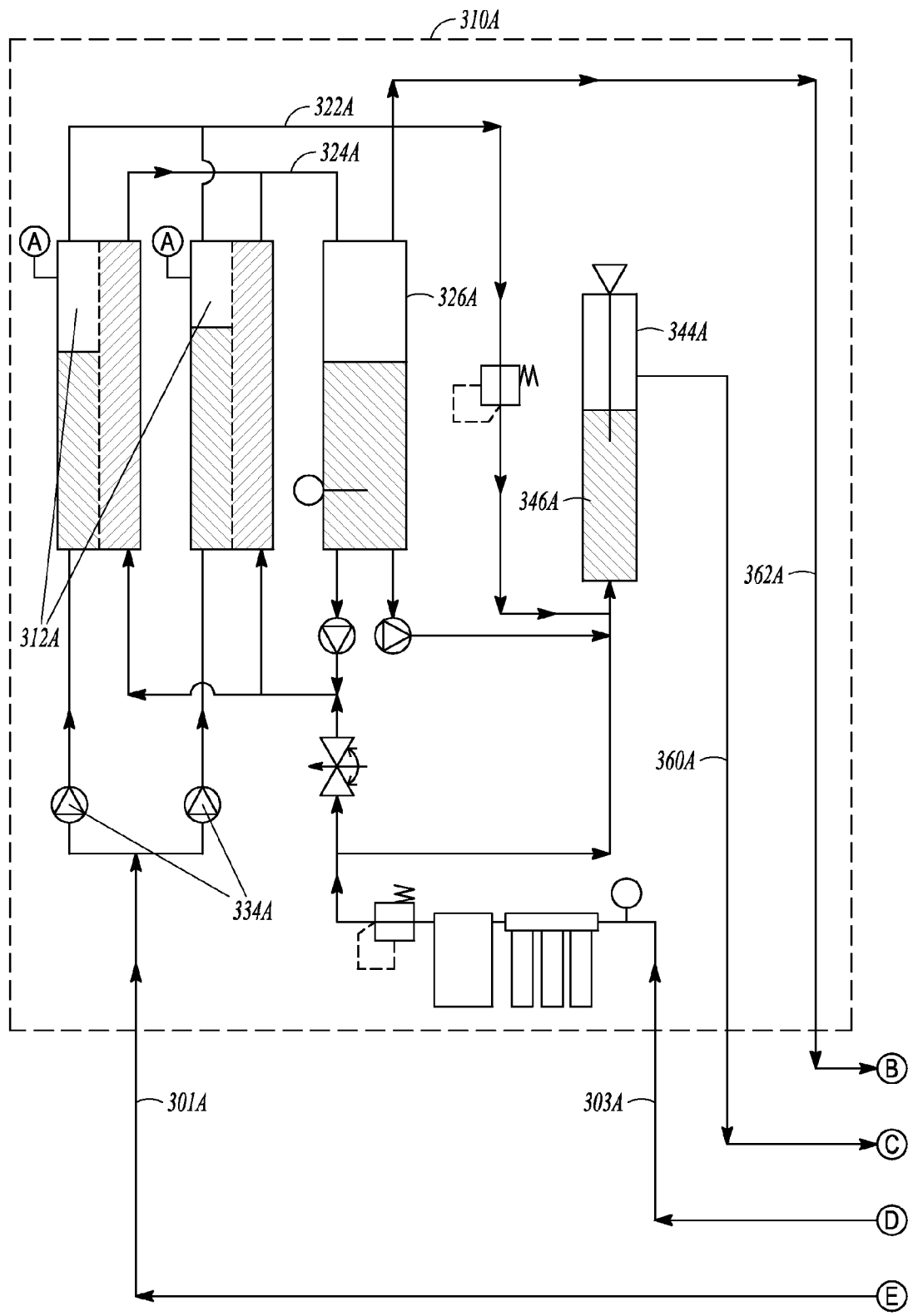
FIGS. 7A and 7B are a schematic flow diagram of another example electrochemical activation device.
Figure 7B:
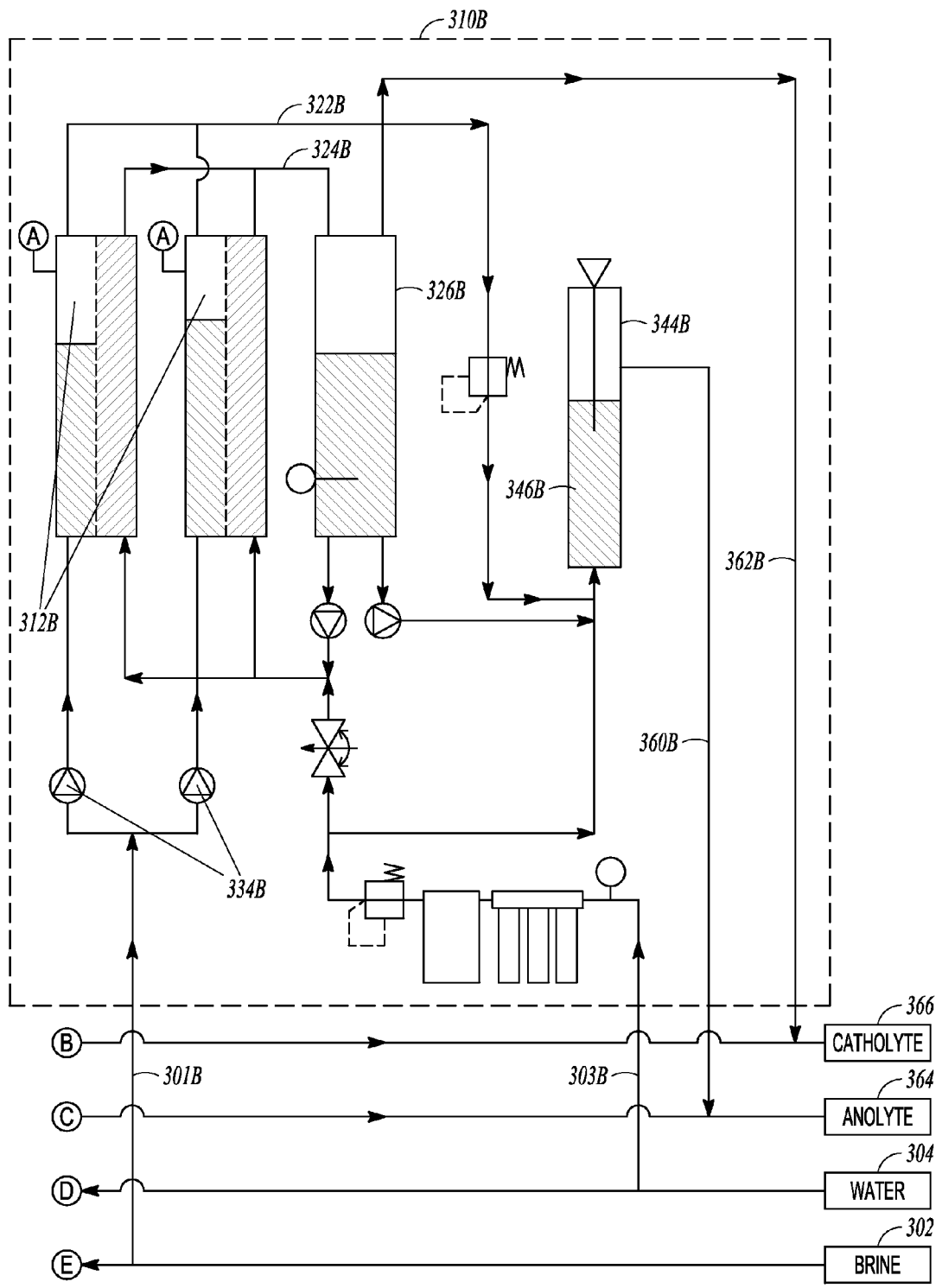

FIGS. 7A and 7B show a schematic flow diagram of an example ECA system 300. The ECA device 300 is similar to the ECA system 10 shown in FIG. 1, with the primary difference being that the ECA system 300 includes a plurality of two or more ECA device modules 310A, 310B.

Each ECA device module 310 can include some or all of the same components as are included in the ECA system 10 of FIG. 1. For example, each ECA device module 310A, 310A can include a corresponding plurality of electrochemical cells 312A, 312B that are each fed a brine solution 301A, 301B from a common brine tank 302 with individual brine deliver pumps 334A, 334B. Water 303A, 303B can also be fed to the electrochemical cells 312A, 312B from a common water mains 304 or pumped from a common water storage tank (not show). The electrochemical cells 312A, 312B can form a chlorine gas stream 322A, 322A from an anode chamber and a catholyte stream 324A, 324B from a cathode chamber. The catholyte stream 324A, 324B can be fed into a catholyte storage tank 326A, 326B, and the chlorine gas stream 322A, 322B can be mixed with water to form an anolyte solution 346A, 346B in an anolyte processing tank 344A, 344B. Other aspects, structures, and methods of use of each ECA device module 310A, 310B can be substantially the same as, or even identical to, the corresponding aspects, structures, and methods of use described above with respect to the example ECA system 10 shown in FIG. 1.

Similar to the single ECA system 10 of FIG. 1, anolyte solution 346A, 346B can be removed from the anolyte processing tank 344A, 344B of each module 310A, 310A via an anolyte product line 360A, 360B. Similarly, a portion of the catholyte solution 328A, 328B can be removed from the catholyte storage tank 326A, 326B of each module 310A, 310B via a catholyte product line 362A, 362B. The anolyte product lines 360A, 360B from the plurality of modules 310A, 310B can be combined to feed the anolyte solution into a common anolyte product tank 364, and the catholyte product lines 362A, 362B from the plurality of modules 310A, 310B can be combined to feed the catholyte solution into a common catholyte product tank 366. As described in more detail above, anolyte product from the anolyte product tank 364 and catholyte product from the catholyte product tank 366 can be combined in various combinations and ratios, along with other additives, to form various cleaning or disinfecting solutions.

Each ECA device module 310A, 310B can be configured to be easily removable and changeable. For example, the components associated with each device module 310A, 310B can be coupled to a common frame or chassis such that the components of the first device module 310A can be moved together and the components of the second device module 310B can be moved together. Piping or tubing connections between each module 310A, 310B and input lines or output lines can be made to be easily disconnected. For example, each brine solution supply line 301A, 301B can include a valve and connection hardware that connects to a corresponding line that feeds brine into the electrochemical cells 312A, 312B. Similarly, the water supply lines 303A, 303B from the water mains 304 can have similar connection hardware and valves. Outlet lines, such as the anolyte product lines 360A, 360B and the catholyte product lines 362A, 362B can also include connection hardware.

Removable modules 310A, 310B can allow for removal and replacement of a malfunctioning module 310A,310B without a significant shutdown time. Removable modules 310A, 310B can also allow the ECA system 300 to be set up with a plurality of modules 310A, 310B, for example, so that the system 300 can have built in redundancy in the event of a malfunctioning component. Finally, removable modules 310A, 310B can provide for customization of the ECA system 300, e.g., depending on available inputs (e.g., available water supply rate from the water mains 304 or the supply rate of brine solution to the brine feed lines 301A, 301B) or the desired output (e.g., desired production rate of anolyte solution, catholyte solution, or both).

For example, each individual module 310A, 310B can be configured to provide a predetermined maximum output rate $R_{Out}$ of the anolyte solution and catholyte solution, based on a predetermined maximum input rate $R_{In}$ of water and brine solution. If a particular user was able to obtain or provide a higher input rate of water and brine solution, then more than one module 310A, 310B can be used together and operated in parallel, as shown in FIGS. 7A and 7B, to increase the total maximum input rate that can be exploited by the system 300 to $nR_{In}$, where n is the total number of modules 310A, 310B and, as described above, $R_{In}$ is the maximum potential input rate of water or brine solution that each module 310A,310B can accommodate. Similarly, if a user desired a larger production rate, then more than one modules 310A, 310B can be used together and operated in parallel to increase the total potential maximum output rate that can be produced by the system 300 to $nR_{Out}$, where n is the total number of modules 310A, 310B and, as described above, $R_{Out}$ is the maximum potential output for each module 310A, 310B.

To better illustrate the ECA system and cells of the present disclosure, the following non-limiting list of Examples is provided here:

Example 1 can include subject matter (such as an apparatus, a device, a method, or one or more means for performing acts), such as can include an electrochemical activation system. The subject matter can comprise a plurality of electrochemical cells each comprising an anode chamber and a cathode chamber, each electrochemical cells being configured to electrolyze an electrolyte to generate an anolyte fluid and a catholyte fluid, a plurality of sets of one or more flow control devices, each of the plurality of sets of one or more flow control devices being configured to control a flow rate of the electrolyte into a corresponding one of the plurality of electrochemical cells, a plurality of current measuring devices, each of the plurality of current measuring devices being configured to measure a current across a corresponding one of the plurality of electrochemical cells, and a control system in data communication with the plurality of sets of one or more flow control devices and the plurality of current measuring devices, the control system being configured to compare the measured current across each of the plurality of electrochemical cells to a current set point, and control the corresponding set of one or more flow control devices to adjust the flow rate of the electrolyte in response to a difference between the measured current across the electrochemical cell and the current set point.

Example 2 can include, or can optionally be combined with the subject matter of claim 1, to optionally include the plurality of electrochemical cells including a first electrochemical cell comprising a first anode chamber and a first cathode chamber and a second electrochemical cell comprising a second anode chamber and a second cathode chamber.

Example 3 can include, or can optionally be combined with the subject matter of one or any combination of Examples 1 and 2, to optionally include the plurality of flow control devices including a first at least one flow control device for controlling a first flow rate of the electrolyte to the first electrochemical cell and a second at least one flow control device for controlling a second flow rate of the electrolyte to the second electrochemical cell.

Example 4 can include, or can optionally be combined with the subject matter of any one or any combination of Examples 1-, to optionally include the plurality of current measuring devices including a first current measuring device configured to measure a first current across the first electrochemical cell and a second current measuring device configured to measure a second current across the second electrochemical cell.

Example 5 can include, or can optionally be combined with the subject matter of any one or any combination of Examples 1-4, to optionally include the control system being configured to compare the measured first current across the first electrochemical cell to a first current set point and control the first at least one flow control device to adjust the first flow rate in response to a difference between the measured first current across the first electrochemical cell and the first current set point.

Example 6 can include, or can optionally be combined with the subject matter of any one or any combination of Examples 1-5, to optionally include the control system being configured to compare the second current across the measured second electrochemical cell to a second current set point and control the second at least one flow control device to adjust the second flow rate in response to a difference between the measured second current across the second electrochemical cell and the second current set point.

Example 7 can include, or can optionally be combined with the subject matter of any one or any combination of Examples 1-6, to optionally include a third electrochemical cell comprising a third anode chamber and a third cathode chamber, a third at least one flow control device for controlling a third flow rate of the electrolyte to the third electrochemical cell, and a third at least one current measuring device configured to measure a third current across the third electrochemical cell.

Example 8 can include, or can optionally be combined with the subject matter of any one or any combination of Examples 1-7, to optionally include the control system being configured to compare the measured third current across the third electrochemical cell to a third current set point and control the third at least one current measuring device to adjust the third flow rate in response to a difference between the measured third current across the third electrochemical cell and the third current set point.

Example 9 can include, or can optionally be combined with the subject matter of any one or any combination of Examples 1-8, to optionally include a catholyte recirculation system configured to recirculate at least a portion of the catholyte fluid from the electrochemical cells to at least one of the plurality of electrochemical cells.

Example 10 can include, or can optionally be combined with the subject matter of any one or any combination of Examples 1-9, to optionally include the catholyte recirculation system comprising a temperature measuring device configured to measure a temperature of at least one of the fluid in the anode chamber, the fluid in the cathode chamber, and the catholyte fluid output from the cathode chamber.

Example 11 can include, or can optionally be combined with the subject matter of any one or any combination of Examples 1-10, to optionally include the control system being configured to compare the measured temperature of the at least one of the fluid in the anode chamber, the fluid in the cathode chamber, and the catholyte fluid output from the cathode chamber.

Example 12 can include, or can optionally be combined with the subject matter of any one or any combination of Examples 1-11, to optionally include the control system being configured to control a second flow control device to adjust the flow rate of the catholyte fluid recirculated to the at least one of the plurality of electrochemical cells in response to a difference between the measured temperature and the temperature set point.

Example 13 can include, or can optionally be combined with the subject matter of any one or any combination of Examples 1-12, to optionally include an anolyte solution subsystem for forming a liquid anolyte solution from the anolyte fluid generated by the plurality of electrochemical cells.

Example 14 can include, or can optionally be combined with the subject matter of any one or any combination of Examples 1-13, to optionally include the anolyte solution subsystem comprising at least one pH control device for controlling a pH of the liquid anolyte solution.

Example 15 can include, or can optionally be combined with the subject matter of any one or any combination of Examples 1-14, to optionally include the anolyte solution subsystem comprising an anolyte reservoir for mixing the anolyte fluid with a water solution to form the liquid anolyte solution.

Example 16 can include, or can optionally be combined with the subject matter of any one or any combination of Examples 1-15, to optionally include the electrolyte comprising a brine solution of an aqueous solution of an inorganic salt.

Example 17 can include, or can optionally be combined with the subject matter of any one or any combination of Examples 1-16, to optionally include the brine solution being saturated with the inorganic salt.

Example 18 can include, or can optionally be combined with the subject matter of one or any combination of Examples 1-17, to include subject matter (such as an apparatus, a device, a method, or one or more means for performing acts), such as can include an electrochemical activation system. The subject matter can comprise at least one electrochemical cell comprising an anode chamber and a cathode chamber, the at least one electrochemical cell being configured to electrolyze an electrolyte to generate anolyte fluid and catholyte fluid, a first fluid delivery line in fluid communication with the anode chamber of the at least one electrochemical cell, a second fluid delivery line in fluid communication with the cathode chamber of the at least one electrochemical cell, a catholyte reservoir configured to receive the catholyte fluid from the at least one electrochemical cell, a temperature measuring device configured to measure a temperature of at least one of the fluid in the anode chamber, the fluid in the cathode chamber, the catholyte fluid output from the cathode chamber, and the catholyte fluid in the catholyte reservoir, at least one flow control device configured to control a flow rate of the catholyte fluid from the catholyte reservoir, an outlet of the at least one flow control device being in fluid communication with the second fluid delivery line, and a control system in data communication with the temperature measuring device and the at least one flow control device, the control system being configured to compare the measured temperature of the at least one of the fluid in the anode chamber, the fluid in the cathode chamber, the catholyte fluid output from the cathode chamber, and the catholyte fluid in the catholyte reservoir and control the at least one flow control device to adjust the flow rate of the catholyte fluid to be fed into the at least one of the first fluid delivery line and the second fluid delivery line electrolyte in response to a difference between the measured temperature and the temperature set point.

Example 19 can include, or can optionally be combined with the subject matter of any one or any combination of Examples 1-18, to optionally include an electrolyte reservoir in fluid communication with the first fluid delivery line.

Example 20 can include, or can optionally be combined with the subject matter of any one or any combination of Examples 1-19, to optionally include the second fluid delivery line being connected to a water source.

Example 21 can include, or can optionally be combined with the subject matter of any one or any combination of Examples 1-20, to optionally include the outlet of the at least one flow control device being in fluid communication with the second fluid delivery line so that the catholyte fluid from the at least one flow control device is mixed with water in the second fluid delivery line.

Example 22 can include, or can optionally be combined with the subject matter of any one or any combination of Examples 1-21, to optionally include an anolyte solution subsystem for forming a liquid anolyte solution from the anolyte fluid generated by the plurality of electrochemical cells.

Example 23 can include, or can optionally be combined with the subject matter of any one or any combination of Examples 1-22, to optionally include the anolyte solution subsystem comprising at least one pH control device for controlling a pH of the liquid anolyte solution Example 24 can include, or can optionally be combined with the subject matter of any one or any combination of Examples 1-23, to optionally include the anolyte solution subsystem comprising an anolyte reservoir for mixing the anolyte fluid with a water solution to form the liquid anolyte solution.

Example 25 can include, or can optionally be combined with the subject matter of any one or any combination of Examples 1-24, to optionally include the at least one electrochemical cell comprising a plurality of electrochemical cells each comprising an anode chamber and a cathode chamber, each electrochemical cells being configured to electrolyze an electrolyte to generate an anolyte fluid and a catholyte fluid.

Example 26 can include, or can optionally be combined with the subject matter of any one or any combination of Examples 1-25, to optionally include a plurality of sets of one or more flow control devices, each of the plurality of sets of one or more flow control devices being configured to control a flow rate of the electrolyte into a corresponding one of the plurality of electrochemical cells.

Example 27 can include, or can optionally be combined with the subject matter of any one or any combination of Examples 1-26, to optionally include a plurality of current measuring devices, each of the plurality of current measuring devices being configured to measure a current across a corresponding one of the plurality of electrochemical cells.

Example 28 can include, or can optionally be combined with the subject matter of any one or any combination of Examples 1-27, to optionally include the control system being configured to compare the measured current across each of the plurality of electrochemical cells to a current set point.

Example 29 can include, or can optionally be combined with the subject matter of any one or any combination of Examples 1-28, to optionally include the control system being configured to control the corresponding set of one or more flow control devices to adjust the flow rate of the electrolyte in response to a difference between the measured current across the electrochemical cell and the current set point.

Example 30 can include, or can optionally be combined with the subject matter of any one or any combination of Examples 1-29, to optionally include the electrolyte comprising a brine solution of an aqueous solution of an inorganic salt.

Example 31 can include, or can optionally be combined with the subject matter of any one or any combination of Examples 1-30, to optionally include the brine solution being saturated with the inorganic salt.

Example 32 can include, or can optionally be combined with the subject matter of one or any combination of Examples 1-17, to include subject matter (such as an apparatus, a device, a method, or one or more means for performing acts), such as can include an electrochemical cell for treatment of a solution by electrolysis. The subject matter can include an inner cylindrical electrode, an outer cylindrical electrode mounted around the inner cylindrical electrode, a ceramic cylindrical diaphragm mounted in an inter-electrode space between the inner electrode and the outer electrode, the ceramic cylindrical diaphragm having a radial thickness, wherein the radial thickness is defined by at least one of;
  a ratio of diaphragm thickness to a pressure within the cell of from about 0.4 to about 2 mm of diaphragm thickness per bar of pressure within the electrochemical cell,
  a ratio of diaphragm thickness to an active length of the electrochemical cell of from about 0.15 mm to about 1 mm of diaphragm thickness per 100 mm of length of the electrochemical cell,
  a ratio of diaphragm thickness to an outer diameter of the electrochemical cell of from about 0.011 to about 0.056 mm of diaphragm thickness per mm of outer diameter of the electrochemical cell,
  a ratio of diaphragm thickness to an inner diameter of the electrochemical cell of from about 0.015 to about 0.15 mm of diaphragm thickness per mm of inner diameter of the electrochemical cell, a ratio of diaphragm thickness to an outer diameter of the diaphragm of from about 0.014 mm to about 0.071 mm of diaphragm thickness per mm of outer diameter of the diaphragm;

a ratio of diaphragm thickness to an active volume between the inner cylindrical electrode and the outer cylindrical electrode of from about 0.0025 to about 0.015 mm of diaphragm thickness per $cm^3$ of volume between the electrodes; and a ratio of diaphragm thickness to an overall volume of the electrochemical cell of from about 0.0017 mm to about 0.0085 mm of diaphragm thickness per $cm^3$ of overall volume of the electrochemical cell.

Example 33 can include, or can optionally be combined with the subject matter of any one or any combination of Examples 1-32, to optionally include the ratio of diaphragm thickness to the pressure within the cell being from about 1.2 to about 1.6 mm of diaphragm thickness per bar of pressure within the electrochemical cell.

Example 34 can include, or can optionally be combined with the subject matter of any one or any combination of Examples 1-33, to optionally include the ratio of diaphragm thickness to the pressure within the cell being about 1.5 mm of diaphragm thickness per bar of pressure within the electrochemical cell.

Example 35 can include, or can optionally be combined with the subject matter of any one or any combination of Examples 1-34, to optionally include the ratio of diaphragm thickness to the active length of the electrochemical cell being from about 0.5 to about 0.7 mm of diaphragm thickness per 100 mm of length of the electrochemical cell.

Example 36 can include, or can optionally be combined with the subject matter of any one or any combination of Examples 1-35, to optionally include the ratio of diaphragm thickness to the active length of the electrochemical cell being about 0.65 mm of diaphragm thickness per 100 mm of length of the electrochemical cell.

Example 37 can include, or can optionally be combined with the subject matter of any one or any combination of Examples 1-36, to optionally include the ratio of diaphragm thickness to the outer diameter of the electrochemical cell being from about 0.03 to about 0.045 mm of diaphragm thickness per mm of outer diameter of the electrochemical cell.

Example 38 can include, or can optionally be combined with the subject matter of any one or any combination of Examples 1-37, to optionally include the ratio of diaphragm thickness to the outer diameter of the electrochemical cell being about 0.04 mm of diaphragm thickness per mm of outer diameter of the electrochemical cell.

Example 39 can include, or can optionally be combined with the subject matter of any one or any combination of Examples 1-38, to optionally include the ratio of diaphragm thickness to the inner diameter of the electrochemical cell being from about 0.05 to about 0.085 mm of diaphragm thickness per mm of inner diameter of the electrochemical cell.

Example 40 can include, or can optionally be combined with the subject matter of any one or any combination of Examples 1-39, to optionally include the ratio of diaphragm thickness to the inner diameter of the electrochemical cell being about 0.079 mm of diaphragm thickness per mm of inner diameter of the electrochemical cell.

Example 41 can include, or can optionally be combined with the subject matter of any one or any combination of Examples 1-40, to optionally include the ratio of diaphragm thickness to the outer diameter of the diaphragm being from about 0.04 to about 0.06 mm of diaphragm thickness per mm of outer diameter of the diaphragm.

Example 42 can include, or can optionally be combined with the subject matter of any one or any combination of Examples 1-41, to optionally include the ratio of diaphragm thickness to the outer diameter of the diaphragm being about 0.054 mm of diaphragm thickness per mm of diaphragm outer diameter.

Example 43 can include, or can optionally be combined with the subject matter of any one or any combination of Examples 1-42, to optionally include the ratio of diaphragm thickness to the active volume between the inner cylindrical electrode and the outer cylindrical electrode being from about 0.0085 to about 0.011 mm of diaphragm thickness per $cm^3$ of volume between the electrodes.

Example 44 can include, or can optionally be combined with the subject matter of any one or any combination of Examples 1-43, to optionally include the ratio of diaphragm thickness to the volume between the inner cylindrical electrode and the outer cylindrical electrode being about 0.01 mm of diaphragm thickness per $cm^3$ of volume between the electrodes.

Example 45 can include, or can optionally be combined with the subject matter of any one or any combination of Examples 1-44, to optionally include the ratio of diaphragm thickness to the overall volume of the electrochemical cell being from about 0.005 to about 0.0068 mm of diaphragm thickness per $cm^3$ of overall volume of the electrochemical cell.

Example 46 can include, or can optionally be combined with the subject matter of any one or any combination of Examples 1-45, to optionally include the ratio of diaphragm thickness to the overall volume of the electrochemical cell being about 0.0064 mm of diaphragm thickness per $cm^3$ of overall volume of the electrochemical cell.

Example 47 can include, or can optionally be combined with the subject matter of any one or any combination of Examples 1-46, to optionally include the radial thickness of the diaphragm being defined by at least one combination of diaphragm thickness per pressure and per overall length of the electrochemical cell; diaphragm thickness per pressure and per outer diameter of the electrochemical cell; diaphragm thickness per pressure and per inner diameter of the electrochemical cell; diaphragm thickness per pressure and per outer diameter of the diaphragm; diaphragm thickness per pressure and per volume between the electrodes; diaphragm thickness per pressure and per overall volume of the electrochemical cell; diaphragm thickness per overall length of the electrochemical cell and per outer diameter of the electrochemical cell; diaphragm thickness per overall length of the electrochemical cell and per inner diameter of the electrochemical cell; diaphragm thickness per overall length of the electrochemical cell and per outer diameter of the diaphragm; diaphragm thickness per overall length of the electrochemical cell and per volume between the electrodes; diaphragm thickness per overall length of the electrochemical cell and per overall volume of the electrochemical cell; diaphragm thickness per outer diameter of the electrochemical cell and per inner diameter of the electrochemical cell; diaphragm thickness per outer diameter of the electrochemical cell and per outer diameter of the diaphragm; diaphragm thickness per outer diameter of the electrochemical cell and per volume between the electrodes; diaphragm thickness per outer diameter of the electrochemical cell and per overall volume of the electrochemical cell; diaphragm thickness per inner diameter of the electrochemical cell and per outer diameter of the diaphragm; diaphragm thickness per inner diameter of the electrochemical cell and per volume between the electrodes; diaphragm thickness per inner diameter of the electrochemical cell and per overall volume of the electrochemical cell; diaphragm thickness per outer diameter of the diaphragm and per volume between the electrodes; diaphragm thickness per outer diameter of the diaphragm and per overall volume of the electrochemical cell; or diaphragm thickness per volume between the electrodes and per overall volume of the electrochemical cell.

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented, at least in part. Some examples can include a computer-readable medium or machine-readable medium encoded with instructions operable to configure an electronic device to perform methods or method steps as described in the above examples. An implementation of such methods or method steps can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

Although the invention has been described with reference to exemplary embodiments, workers skilled in the art will recognize that changes may be made in form and detail without departing from the spirit and scope of the invention.

What is claimed is:

1. A system, comprising:
   a plurality of electrochemical cells each comprising an anode chamber and a cathode chamber, each electrochemical cell being configured to electrolyze an electrolyte to generate an anolyte fluid and a catholyte fluid;
   a plurality of sets of one or more flow control devices, each of the plurality of sets of one or more flow control devices being configured to control a flow rate of the electrolyte into a corresponding one of the plurality of electrochemical cells;
   a plurality of current measuring devices, each of the plurality of current measuring devices being configured to measure a current across a corresponding one of the plurality of electrochemical cells; and
   a control system in data communication with the plurality of sets of one or more flow control devices and the plurality of current measuring devices, the control system being configured to:
      compare the measured current across each of the plurality of electrochemical cells to a current set point; and
      control the corresponding set of one or more flow control devices to adjust the flow rate of the electrolyte in response to a difference between the measured current across the electrochemical cell and the current set point.

2. The system of claim 1, wherein:
   the plurality of electrochemical cells includes a first electrochemical cell comprising a first anode chamber and a first cathode chamber and a second electrochemical cell comprising a second anode chamber and a second cathode chamber;
   the plurality of flow control devices includes a first at least one flow control device for controlling a first flow rate of the electrolyte to the first electrochemical cell and a second at least one flow control device for controlling a second flow rate of the electrolyte to the second electrochemical cell;
   the plurality of current measuring devices includes a first current measuring device configured to measure a first current across the first electrochemical cell and a second current measuring device configured to measure a second current across the second electrochemical cell; and
   the control system is configured to:
      compare the measured first current across the first electrochemical cell to a first current set point and control the first at least one flow control device to adjust the first flow rate in response to a difference between the measured first current across the first electrochemical cell and the first current set point; and
      compare the second current across the measured second electrochemical cell to a second current set point and control the second at least one flow control device to adjust the second flow rate in response to a difference between the measured second current across the second electrochemical cell and the second current set point.

3. The system of claim 2, further comprising:
   a third electrochemical cell comprising a third anode chamber and a third cathode chamber;

a third at least one flow control device for controlling a third flow rate of the electrolyte to the third electrochemical cell; and a third at least one current measuring device configured to measure a third current across the third electrochemical cell;

wherein the control system is further configured to compare the measured third current across the third electrochemical cell to a third current set point and control the third at least one current measuring device to adjust the third flow rate in response to a difference between the measured third current across the third electrochemical cell and the third current set point.

4. The system of claim 1, further comprising a catholyte recirculation system configured to recirculate at least a portion of the catholyte fluid from the electrochemical cells to at least one of the plurality of electrochemical cells.

5. The system of claim 4, wherein the catholyte recirculation system comprises a temperature measuring device configured to measure a temperature of at least one of the fluid in the anode chamber, the fluid in the cathode chamber, and the catholyte fluid output from the cathode chamber, and wherein the control system is further configured to;
compare the measured temperature of the at least one of the fluid in the anode chamber, the fluid in the cathode chamber, and the catholyte fluid output from the cathode chamber; and control a second flow control device to adjust the flow rate of the catholyte fluid recirculated to the at least one of the plurality of electrochemical cells in response to a difference between the measured temperature and the temperature set point.

6. The system of claim 1, further comprising an anolyte solution subsystem for forming a liquid anolyte solution from the anolyte fluid generated by the plurality of electrochemical cells.

7. The system of claim 6, wherein the anolyte solution subsystem comprises at least one pH control device for controlling a pH of the liquid anolyte solution.

8. The system of claim 6, wherein the anolyte solution subsystem comprises an anolyte reservoir for mixing the anolyte fluid with a water solution to form the liquid anolyte solution.

9. The system of claim 1, wherein the electrolyte comprises a brine solution of an aqueous solution of an inorganic salt.

10. The system of claim 9, wherein the brine solution is saturated with the inorganic salt.

11. The system of claim 1, wherein the control system is further configured to determine if one of the plurality of electrochemical cells is faulty based on comparison between the measured current across each of the plurality of electrochemical cells to the current set point.

12. The system of claim 11, wherein the control system is further configured to provide an alert indicating which of the plurality of electrochemical cells is faulty.

13. The system of claim 11, wherein the control system determines if one of the plurality of electrochemical cells is faulty if a difference between one or more parameters of the faulty cell and a corresponding one or more parameters of other of the plurality of electrochemical cells is above a specified threshold.

14. The system of claim 13, wherein the one or more parameters comprises an input rate of electrolyte into each of the plurality of electrochemical cells.

* * * * *